US 6,641,785 B1

(12) United States Patent
Neufert et al.

(10) Patent No.: US 6,641,785 B1
(45) Date of Patent: Nov. 4, 2003

(54) CATALYTIC CONVERTER AND METHOD FOR CLEANING EXHAUST GAS

(75) Inventors: Ronald Neufert, Michelau (DE); Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 507 days.

(21) Appl. No.: 09/640,151

(22) Filed: Aug. 16, 2000

Related U.S. Application Data

(63) Continuation of application No. PCT/DE99/00413, filed on Feb. 15, 1999.

(30) Foreign Application Priority Data

Feb. 16, 1998 (DE) .......................... 198 06 266

(51) Int. Cl.[7] .......................... B01D 53/56; B01D 53/58; B01D 53/94; B01J 23/64
(52) U.S. Cl. .......................... 422/177; 422/172; 422/180; 423/213.2; 423/213.5; 423/239.1; 502/242; 502/247; 502/254; 502/255; 502/305; 502/309; 502/312; 502/313
(58) Field of Search .......................... 422/172, 177, 422/180; 423/213.2, 213.5, 239.1; 502/242, 247, 254, 255, 305, 309, 312, 313, 326

(56) References Cited

U.S. PATENT DOCUMENTS

| 3,951,866 | A |   | 4/1976  | Goto ........................ 502/241 |
| 4,186,109 | A |   | 1/1980  | Atsukawa et al. ........ 423/213.5 |
| 4,282,115 | A | * | 8/1981  | Atsukawa et al. .......... 502/218 |
| 4,719,192 | A |   | 1/1988  | Schneider et al. ............. 502/84 |
| 4,792,439 | A | * | 12/1988 | Schneider et al. ....... 423/239.1 |
| 5,155,083 | A | * | 10/1992 | Yoshida et al. ............. 502/242 |
| 5,409,681 | A | * | 4/1995  | Kato et al. ............... 423/239.1 |
| 5,643,542 | A | * | 7/1997  | Leyrer et al. ............... 423/212 |

FOREIGN PATENT DOCUMENTS

| DE | 27 44 688 A1 | 4/1978 |
| EP | 0 212 513 A1 | 3/1987 |
| EP | 0 398 752 A1 | 11/1990 |
| EP | 0 487 886 B1 | 6/1992 |
| EP | 0 544 282 A1 | 6/1993 |
| EP | 0 706 847 A1 | 4/1996 |

* cited by examiner

Primary Examiner—Hien Tran
(74) Attorney, Agent, or Firm—Laurence A. Greenberg; Werner H. Stemer; Gregory L. Mayback

(57) ABSTRACT

The invention relates to a catalytic converter and a method for cleaning the exhaust gas from an internal combustion engine which is operated with excess air. The catalytic converter has an active material made from the oxides $TiO_2$, $V_2O_5$, CaO and $SiO_2$, as well as $WO_3$ and/or $MoO_3$. An active material of this type has the property of using the SCR method to reduce to equal extents the levels of nitrogen oxides and hydrocarbons. The CO oxidation activity of a material of this type can be increased by metering in elements selected from the group consisting of Pt, Pd, Rh, Ru and Ir in any desired inorganic form.

20 Claims, 1 Drawing Sheet

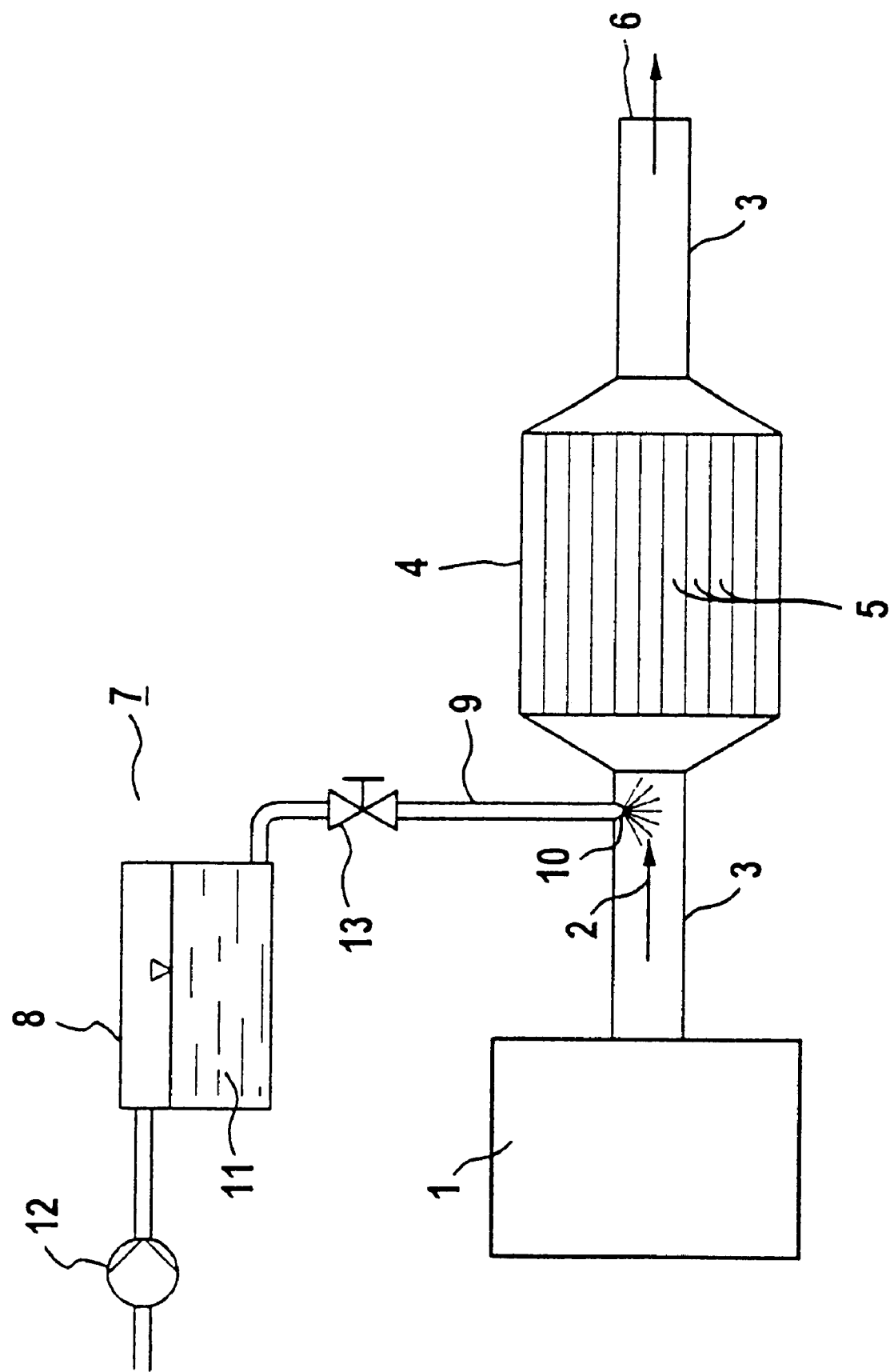

CATALYTIC CONVERTER AND METHOD FOR CLEANING EXHAUST GAS

CROSS-REFERENCE TO RELATED APPLICATION

This is a continuation of copending International Application PCT/DE99/00413, filed Feb. 15, 1999, which designated the United States.

BACKGROUND OF THE INVENTION

Field of the Invention

The invention relates to a catalytic converter and a method for purifying the exhaust gas from a combustion engine which is operated with excess air, in particular from a motor vehicle engine.

It is known that a large number of different groups of pollutants are formed during the combustion of fuels, e.g. diesel fuel. To eliminate or reduce the levels of these groups of pollutants, different catalytic conversions and different catalytic converters or active materials are required. To reduce the levels of emissions in the exhaust gas, there are generally a plurality of cleaning systems, each with a specific action, connected in series or in parallel. For example, different catalytic systems are used to reduce $NO_x$ compounds from those used for the oxidative conversion of hydrocarbon compounds.

A method for the selective catalytic reduction of $NO_x$ in oxygen-containing exhaust gas is described, for example, in European patent EP 0 487 886 B1. The exhaust-gas flow is mixed with a nitrogen-containing reducing agent by means of a metering device. Then, this mixture is brought into contact with an SCR catalytic converter which uses the selective catalytic reduction (SCR) method to break down nitrogen oxides contained in the exhaust gas, using the reducing agent, to form molecular nitrogen and water. Highly volatile or gaseous organic compounds (HVOC and VOC) and compounds with a moderate to low volatility which accumulate on particles (SOF) are only insufficiently influenced by the SCR catalytic converter in the low-temperature range. To reduce the levels of these emissions, a further catalytic converter system in the form of an oxidation catalytic converter is required. Therefore, an oxidation catalytic converter as described, for example, in EP 0 692 301 A2 is generally connected downstream of an SCR catalytic converter. Therefore, in conventional catalytic converter systems for reducing the levels of $NO_x$ and hydrocarbon emissions, the complexity of the equipment and the associated costs are relatively high. Furthermore, in some instances the exhaust-gas flow is subjected to still further cleaning steps, which, however, further increases the complexity of the equipment and the costs.

SUMMARY OF THE INVENTION

It is accordingly an object of the invention to provide a simplified catalytic converter system for purifying exhaust emitted from a combustion engine operated with excess air, that overcomes the above-mentioned disadvantages of the prior art devices and methods of this general type, and in particular allows the concentration of both volatile organic compounds and nitrogen oxides in the exhaust gas, thereby taking up a small installation space and achieving low production costs.

With the foregoing and other objects in view there is provided, according to the invention, a system for purifying the exhaust gas from a combustion engine operated with excess air, comprising an exhaust line transporting exhaust gas from said combustion engine, a feeding device for bringing into contact with said exhaust gas at least one nitrogenous reducing agent and a downstream catalytic device for diminishing the concentration of nitrogen oxides and volatile organic compounds in said exhaust gas including a novel catalytically active material comprising the oxides $TiO_2$, $V_2O_5$, $CaO$ and $SiO_2$ and at least one oxide selected from the group consisting of $WO_3$ and $MoO_3$, wherein the proportions of said oxides are as follows (% by weight):

| | |
|---|---|
| $TiO_2$: | 70–95% |
| $WO_3$ and/or $MoO_3$: | 2–10% |
| $V_2O_5$: | 0.1–5% |
| $CaO$: | 0.1–8% |
| $SiO_2$: | 0.1–10%. |

When in contact with the catalytically active material according to the invention, the reducing agent introduced from the feeding device is catalytically decomposed, to afford ammonia, and the nitrogen oxides contained in the exhaust gas stream are converted owing to the SCR activity of the catalyst, by reaction with the aid of the ammonia produced, into harmless nitrogen and water.

In accordance with another feature of this invention, there is also provided a method for purifying an exhaust gas from a combustion engine operated with excess air and containing nitrogen oxides, in which the exhaust gas from the combustion engine is transported through an exhaust line into contact with at least one reducing agent supplied from a feeding device and thence into contact with a catalytically active material comprising the oxides $TiO_2$, $V_2O_5$, $CaO$ and $SiO_2$ and at least one oxide selected from the group consisting of $WO_3$ and $MoO_3$, wherein the proportions of said oxides are as follows (% by weight):

| | |
|---|---|
| $TiO_2$: | 70–95% |
| $WO_3$ and/or $MoO_3$: | 2–10% |
| $V_2O_5$: | 0.1–5% |
| $CaO$: | 0.1–8% |
| $SiO_2$: | 0.1–10%. |

The catalytic converter according to the invention can include known auxiliary and filler materials. Such an auxiliary or filler is understood as meaning the fillers, auxiliaries and binders which are customary for ceramic materials, such as for example ceramic fibers or glass fibers as filler/supporting agents, resins, shellac or cellulose as pore-forming agent, and butyl glycol, isopropanol, ethyl glycol or polyethylene oxide as film-forming auxiliary.

Surprisingly, it has been found that with the active material according to the invention the levels of both volatile organic compounds and nitrogen oxides—the latter in the presence of a nitrogen-containing reducing agent—in an exhaust gas can be reduced particularly effectively. In the low-temperature range, the organic compounds accumulate on the active material by chemisorption; at relatively high temperatures they are primarily oxidized to form carbon dioxide and water. At the same time, however, the active material also catalyzes the reaction between the $NO_x$ compounds and the reducing agent which is fed to the exhaust gas.

The catalytic converter and the method therefore allow simultaneous conversion of organic compounds and $NO_x$ using the same active material. Where previously two separate catalytic bodies, each in their own housing or at least housing compartment were required for said conversions, now only a single-piece catalytic converter is required. This reduces the installation space required, which is advantageous in particular in motor vehicles, and the production costs.

Particularly good reduction levels are achieved if the active material is composed of, in % by weight, 70–95% $TiO_2$, 2–10% $WO_3$ and/or $MoO_3$, 0.1–5% $V_2O_5$, 0.1–8% CaO and 0.1–10% $SiO_2$.

Furthermore, it has been found that the CO oxidation activity of the active material can be improved by doping with or admixing with elements selected from the group consisting of Pt, Pd, Rh, Ru and Ir, without the capacity for simultaneous reduction of the levels of $NO_x$ and hydrocarbons being significantly impaired. Said elements selected from the group of platinum metals in the periodic system of the elements (PSE) may be added individually or as a mixture and in any desired inorganic form or compound, for example as halides, nitrates, or oxides.

A particularly good CO oxidation activity is attained if said platinum metals are added in an amount of from 0.01–5% by weight.

To produce the catalytic converter, the catalytically active material described above together with fillers and auxiliaries when present can be extruded to form a solid extrudate. A monolithic catalytic body of this type has, for example, a large number of parallel flow passages, through which the exhaust gas can flow, passing through it. Another possibility consists in coating an inert catalytic body, for example made of ceramic or metal, with the active material. In each case, the active material is prepared by mixing, milling and kneading of the oxides or their precursor compounds, if appropriate with the addition of customary ceramic auxiliaries and fillers. A catalytic body made from an active material of this type or a metallic or ceramic support body which is coated with an active material of this type, for example in honeycomb or plate form, is dried at temperatures of between 20° C. and 100° C. and calcined at a temperature of from 200° C. to 800° C.

The BET surface area of the catalytic converter should be in the range from 30 $m^2/g$ to 150 $m^2/g$. The pore volume, measured using the Hg penetration method, should be in the range from 100 $mm^3/g$ to 1000 $mm^3/g$ with a monomodal or polymodal pore radius distribution.

Other features which are considered as characteristic for the invention are set forth in the appended claims.

Although the invention is illustrated and described herein as embodied in a catalytic converter and method for cleaning exhaust gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE is a diagrammatic side view of an exhaust gas purification system according to the invention.

DETAILED DESCRIPTION OF THE PREFERRED EMBODIMENT

As shown in the figure, an exhaust-gas purification system for catalytically purifying the exhaust gas from a diesel engine 1 (not shown in more detail) is provided. In this system, the exhaust gas from the diesel engine 1 flows as a gas stream 2 through an exhaust pipe 3 and a catalytic converter 4 arranged in the exhaust pipe 3. The catalytic converter 4 is shaped as a honeycomb body; it has a number of parallel passages 5 through which gas can flow. After it has flowed through the catalytic body 4, the gas stream 2 from which the nitrogen oxides have been removed is released to atmosphere via an outlet 6.

The catalytic converter 4 has an active material comprising 85% by weight $TiO_2$, 7% by weight $WO_3$, 2% by weight $V_2O_5$, 1% by weight CaO, 3% by weight SiO and 2% by weight Pt. It is produced as a solid extrudate made from the active material, comprises 40×40 cells and has a catalytic converter volume of 720 l and a specific surface area of 890 $m^2/cm^3$. The diesel engine 1 is an 8-cylinder diesel engine with a power of 920 KW at a speed of 750 rpm. The exhaust-gas volumetric flow rate is 720 $m^3/h$, measured in cubic meters under standard conditions (S.T.P.).

To break down the nitrogen oxides $NO_x$ using the SCR method, an injector device 7 for introducing reducing agent is fitted to the exhaust pipe 3 upstream of the catalytic converter 4, as seen in the direction of flow. The injector device 7 in this case comprises a reducing-agent vessel 8 with a reducing-agent line 9 which is connected to the exhaust pipe 3. The reducing-agent line 9 opens out inside the exhaust pipe 3 in an injection nozzle 10. By means of a compressor 12, an aqueous urea solution 11 is introduced into the gas stream 2 in the exhaust pipe 3 as required, via the controllable valve 13, as a reducing agent. In the hot gas stream 2, urea is converted into the reducing agent ammonia by pyrolysis and/or thermolysis. Then, at the catalytic converter 4 the nitrogen oxides contained in the gas stream 2 are converted in the presence of ammonia, by the SCR method, into molecular nitrogen and water.

At the figures indicated, an $NO_x$ conversion of 87.8% combined, at the same time, with a hydrocarbon conversion of 88.8% and a particle reduction of 43.9% was achieved. The catalytic converter (4) was heated to its operating temperature.

We claim:

1. A catalytic converter for purifying an exhaust gas from an engine operated with excess air, comprising a catalytically active material with the oxides $TiO_2$, $V_2O_5$, CaO and $SiO_2$ and at least one oxide selected from the group consisting of $WO_3$ and $MoO_3$, wherein the proportions of said oxides are, in % by weight:

| | |
|---|---|
| $TiO_2$: | 70–95 |
| $WO_3$ and/or $MoO_3$: | 2–10 |
| $V_2O_5$: | 0.1–5 |
| CaO: | 0.1–8 |
| $SiO_2$: | 0.1–10. |

2. The catalytic converter according to claim 1, wherein said engine is a vehicle engine.

3. The catalytic converter according to claim 1, wherein said active material additionally comprises at least one element selected from the group consisting of Pt, Pd, Rh, Ru and Ir in an inorganic form.

4. The catalytic converter according to claim 3, wherein the proportions of said oxides and said at least one element are, in % by weight:

| | |
|---|---|
| TiO$_2$: | 70–95 |
| WO$_3$ and/or MoO$_3$: | 2–10 |
| V$_2$O$_5$: | 0.1–5 |
| CaO: | 0.1–8 |
| SiO$_2$: | 0.1–10 |
| Pt, Pd, Rh, Ru and/or Ir: | 0.01–5. |

5. The catalytic converter according to claim 1, comprising a single-piece catalytic body constructed of said catalytically active material.

6. The catalytic converter according to claim 1, comprising a single-piece catalytic body constructed of catalytically inactive solid coated with said catalytically active material.

7. The catalytic converter according to claim 1, wherein said catalytically active material has a BET surface area of 30–150 m$^2$/g.

8. The catalytic converter according to claim 1, wherein said catalytically active material has a pore volume, measured using an Hg penetration method, of 100–1000 mm$^3$/g.

9. The catalytic converter according to claim 1, comprising a single-piece catalytic body which is a solid extrudate of said catalytically active material.

10. A method for purifying an exhaust gas from an internal combustion engine operated with excess air, comprising the steps of:

metering a nitrogen-containing reducing agent into the exhaust gas; and passing the exhaust gas containing the reducing agent through a catalytic converter according to claim 1.

11. The method according to claim 10, wherein the engine is a vehicle engine.

12. The method according to claim 10, wherein the reducing agent is selected from the group consisting of ammonia and urea.

13. The method according to claim 10, wherein nitrogen oxides contained in the exhaust gas are converted to molecular nitrogen, organic compounds contained in the exhaust gas are adsorbed and/or converted into carbon dioxide, and carbon monoxide when present is oxidized to form carbon dioxide.

14. The catalytic converter according to claim 1 disposed within an exhaust pipe communicating with said engine, with an injector device for introducing reducing agent upstream of the converter, and with an outlet to the atmosphere downstream of the converter.

15. The catalytic converter according to claim 1 shaped as a honeycomb body having a plurality of parallel passages open to the flow of gas therethrough.

16. A catalytically active composition for purifying exhaust gas from the combustion of fuel in an engine, comprising the oxides TiO$_2$, V$_2$O$_5$, CaO and SiO$_2$ and at least one oxide selected from the group consisting of WO$_3$ and MoO$_3$, wherein the proportions of said oxides are, in % by weight:

| | |
|---|---|
| TiO$_2$: | 70–95 |
| WO$_3$ and/or MoO$_3$: | 2–10 |
| V$_2$O$_5$: | 0.1–5 |
| CaO: | 0.1–8 |
| SiO$_2$: | 0.1–10. |

17. The composition according to claim 16, additionally comprising at least one element selected from the group consisting of Pt, Pd, Rh, Ru and Ir in an inorganic form.

18. The composition of claim 17, wherein the proportions of said oxides and said at least one element are, in % by weight:

| | |
|---|---|
| TiO$_2$: | 70–95 |
| WO$_3$ and/or MoO$_3$: | 2–10 |
| V$_2$O$_5$: | 0.1–5 |
| CaO: | 0.1–8 |
| SiO$_2$: | 0.1–10 |
| Pt, Pd, Rh, Ru and/or Ir: | 0.01–5. |

19. The composition according to claim 16, having a BET surface area of 30–150 m$^2$/g.

20. The composition according to claim 16, having a pore volume, measured with an Hg penetration method, of 100–1000 mm$^3$/g.

\* \* \* \* \*